United States Patent
Porte et al.

(10) Patent No.: US 12,014,714 B2
(45) Date of Patent: Jun. 18, 2024

(54) CELLULAR SOUND INSULATION STRUCTURE INCLUDING A DIAPHRAGM PROVIDED WITH A TUBE CONFIGURED TO TREAT DIFFERENT ACOUSTIC FREQUENCIES, METHOD FOR MANUFACTURING SUCH A CELLULAR SOUND INSULATION STRUCTURE, AND ASSOCIATED TOOL

(71) Applicant: Airbus Operations SAS, Toulouse (FR)

(72) Inventors: Alain Porte, Toulouse (FR); Jacques Lalane, Toulouse (FR); Florian Ravise, Toulouse (FR); Franck Dobigeon, Toulouse (FR); Florent Mercat, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 291 days.

(21) Appl. No.: 17/330,910

(22) Filed: May 26, 2021

(65) Prior Publication Data
US 2021/0375252 A1  Dec. 2, 2021

(30) Foreign Application Priority Data

May 29, 2020 (FR) ...................................... 2005672

(51) Int. Cl.
*B32B 3/12* (2006.01)
*B32B 3/26* (2006.01)
(Continued)

(52) U.S. Cl.
CPC .............. *G10K 11/168* (2013.01); *B32B 3/12* (2013.01); *B32B 3/266* (2013.01); *B32B 3/28* (2013.01);
(Continued)

(58) Field of Classification Search
CPC .. B32B 3/12; B32B 3/266; B32B 3/28; B32B 5/024; B32B 2262/103; B32B 2307/102;
(Continued)

(56) References Cited

U.S. PATENT DOCUMENTS

| 3,887,031 A | * | 6/1975 | Wirt | ..................... | G10K 11/172 |
| | | | | | 181/292 |
| 4,035,535 A | * | 7/1977 | Taylor | .................. | G10K 11/172 |
| | | | | | 428/116 |

(Continued)

FOREIGN PATENT DOCUMENTS

| CN | 109572993 A | * | 4/2019 | ............. | B32B 15/00 |
| FR | 3055662 A1 | | 3/2018 | | |
| GB | 2005384 A | | 4/1979 | | |

OTHER PUBLICATIONS

French Search Report; priority document.

*Primary Examiner* — Jeremy A Luks (74) *Attorney, Agent, or Firm* — Greer, Burns & Crain, Ltd.

(57) ABSTRACT

A cellular sound insulation structure and associated aircraft, a cell of which is provided with a diaphragm which includes a membrane having at least one orifice passing through a thickness of the membrane, and at least one tube surmounting the orifice and extending from a face of the membrane into one compartment of the cell, the tube comprising a free end, forming an acoustic outlet, which is positioned at a distance (p) from the base cross section of the cell. Also, a method for manufacturing such a cellular sound insulation structure, as well as to a tool for inserting a diaphragm into (Continued)

a cell. Such a cellular structure makes it possible to treat a wider acoustic frequency spectrum, and its acoustic dimensioning as well as its manufacture are simplified.

7 Claims, 6 Drawing Sheets

(51) Int. Cl.
*B32B 3/28* (2006.01)
*B32B 5/02* (2006.01)
*B64D 29/00* (2006.01)
*B64D 33/02* (2006.01)
*G10K 11/168* (2006.01)

(52) U.S. Cl.
CPC .............. *B32B 5/024* (2013.01); *B64D 29/00* (2013.01); *B64D 33/02* (2013.01); *B32B 2262/103* (2013.01); *B32B 2307/102* (2013.01); *B32B 2605/18* (2013.01); *B64D 2033/0206* (2013.01)

(58) Field of Classification Search
CPC .... B32B 2605/18; B64D 29/00; B64D 33/02; B64D 2033/0206; F02C 7/045; F02C 7/24; F05D 2250/283; F05D 2260/963; G10K 11/168
See application file for complete search history.

(56) References Cited

U.S. PATENT DOCUMENTS

| | | | | |
|---|---|---|---|---|
| 4,106,587 A | * | 8/1978 | Nash | F02K 1/827 |
| | | | | 181/290 |
| 4,231,447 A | * | 11/1980 | Chapman | G10K 11/172 |
| | | | | 181/294 |
| 5,760,349 A | * | 6/1998 | Borchers | B64G 1/002 |
| | | | | 181/293 |
| 5,785,919 A | * | 7/1998 | Wilson | B32B 3/12 |
| | | | | 264/250 |
| 6,615,950 B2 | * | 9/2003 | Porte | G10K 11/172 |
| | | | | 181/290 |
| 7,337,875 B2 | * | 3/2008 | Proscia | F02C 7/24 |
| | | | | 181/290 |
| 7,401,682 B2 | * | 7/2008 | Proscia | F02K 1/827 |
| | | | | 239/265.17 |
| 7,857,093 B2 | | 12/2010 | Sternberger et al. | |
| 9,643,392 B2 | * | 5/2017 | Butler | B32B 27/06 |
| 9,752,595 B2 | * | 9/2017 | Alonso-Miralles | F04D 29/522 |
| 10,280,839 B2 | * | 5/2019 | Riou | F02C 7/045 |
| 10,363,726 B2 | * | 7/2019 | Butler | F02K 1/827 |
| 11,434,826 B2 | * | 9/2022 | Riou | G10K 11/172 |
| 2015/0041247 A1 | * | 2/2015 | Ichihashi | G10K 11/172 |
| | | | | 29/896.2 |
| 2015/0041248 A1 | * | 2/2015 | Ichihashi | F02C 7/24 |
| | | | | 29/896.2 |
| 2017/0072674 A1 | * | 3/2017 | Butler | B32B 37/146 |

* cited by examiner

CELLULAR SOUND INSULATION STRUCTURE INCLUDING A DIAPHRAGM PROVIDED WITH A TUBE CONFIGURED TO TREAT DIFFERENT ACOUSTIC FREQUENCIES, METHOD FOR MANUFACTURING SUCH A CELLULAR SOUND INSULATION STRUCTURE, AND ASSOCIATED TOOL

CROSS-REFERENCES TO RELATED APPLICATIONS

This application claims the benefit of the French patent application No. 2005672 filed on May 29, 2020, the entire disclosures of which are incorporated herein by way of reference.

FIELD OF THE INVENTION

The present invention relates to a cellular structure, and more particularly to a cellular sound insulation structure.

It also relates to a method for manufacturing such a cellular structure, as well as to a tool for carrying out the method.

BACKGROUND OF THE INVENTION

The cellular structure may have various applications, particularly in the aeronautical field, for example in an aircraft nacelle.

Here, a cellular structure refers to a structure comprising cells, that is to say, juxtaposed hollow unitary volumes.

Such a structure may be made of various materials, for example plastic, composite or metallic materials. The cells may have various geometries. One well-known form of a cellular structure has cells in the shape of a right prism with a hexagonal base. The term "honeycombed" structure is often used to denote this type of structure with hexagonal cells, although this expression is sometimes used by abuse of terminology to denote cellular panels having other cell shapes.

Such a structure may be used in many technical fields, particularly in the aeronautical field.

For example, a nacelle of an aircraft propulsion unit generally comprises an air intake, which is an acoustic structure that is intended to ensure acoustic treatment of a front part of the nacelle and to absorb possible sound pollution that may originate from a rotor of an engine.

The air intake traditionally comprises an acoustic panel which mainly ensures the acoustic treatment and a large part of an internal aerodynamic behavior of the air intake.

The acoustic panel may be made of composites and manufactured in a single piece. Its entire internal surface may ensure the acoustic treatment.

In this context, the acoustic panel may be dimensioned to withstand various stresses, for example a loss of a blade of the rotor, an aerodynamic load (overpressure) over all of an internal periphery of the acoustic panel, a bird strike, various thermal stresses, etc.

To these ends, at least a part of the acoustic panel conventionally comprises a core made of a cellular (inaccurately referred to as "honeycombed") structure, which is configured to dampen sound pollution and is interposed between an acoustic skin ("resistive skin") forming a first face and a structural rear skin ("backing skin") forming a second face of the acoustic panel.

One purpose of the acoustic skin is to transmit the noise. It is composed, for example, of a plurality of layers, one of which is a porous layer, often having holes.

The structural rear skin has the function, in particular, of performing the role of an acoustic reflector, as well as of greatly contributing to the structural strength of the acoustic panel.

By varying a thickness of the acoustic panel, it is possible to attenuate high or low frequencies: the thicker the panel is, the lower the attenuated frequencies are. Propulsion units sometimes use an engine with a high dilution ratio, which, for a given level of thrust, has wider and shorter dimensions and fan blades of larger dimensions, which may be associated with lower rotational speeds than a traditional engine. The frequencies to be attenuated are then lower.

However, the acoustic panels known in the prior art are generally effective only for a narrow interval of dominant frequencies of this type of engine.

In order to attenuate frequencies in a wider range, U.S. Pat. No. 7,857,093 B2 proposes, for example, to superimpose two honeycomb layers in order to absorb lower frequencies.

However, such a solution effectively leads to a larger size. A thickness of the acoustic panel is increased significantly, leading to an increase in the mass and rigidity of the acoustic panel.

SUMMARY OF THE INVENTION

The invention thus aims to provide an acoustic structure making it possible at least to treat a wider range of frequencies, while limiting its size.

To this end, a first aspect provides a cellular sound insulation structure comprising at least one cell having a base cross section S of arbitrary shape and a height H, characterized in that the cell comprises a diaphragm, the diaphragm comprising a membrane dividing the cell into two compartments along the height H, the membrane comprising at least one orifice passing through a thickness of the membrane, and the diaphragm comprising at least one tube enclosing the at least one orifice and extending from a face of the membrane into one of the two compartments, the tube comprising a free end, forming an acoustic outlet, which is positioned at a distance p from the base cross section S.

Such a cellular structure is thus configured to treat a wider spectrum of acoustic frequencies than a cellular structure without a diaphragm, that is to say, high and/or low acoustic frequencies.

Such a tube, more particularly, makes it possible to treat lower frequencies. One of the two compartments, the one into which the tube extends, is then configured to treat low frequencies while the other of the two compartments is configured to treat high frequencies.

The two compartments then communicate acoustically, or fluidically, with one another through the tube.

Since dimensioning of the tube is known beforehand, a diaphragm according to the invention thus allows simpler acoustic dimensioning of the structure.

Furthermore, such a diaphragm is industrially more robust. Such a diaphragm may be fitted to a large number of cells that differ in shape and dimensions.

If required, the diaphragm may comprise a plurality of tubes, for example between one and ten tubes.

Here, a tube denotes a conduit having any type of cross section, which may or may not have constant dimensions over the height of the tube, and forming a protuberance with respect to the membrane. It may be cylindrical or frusto-conical, with a polygonal or circular cross section.

The acoustic outlet is a part of the diaphragm which is configured to transmit acoustic waves.

In one exemplary embodiment, the acoustic outlet of the tube comprises at least one orifice, microperforations and/or a woven zone.

Thus, starting with the selected basic cellular structure (that is to say, initially without a diaphragm), which may even be standard, the diaphragm is arranged in the cell as a function of the frequencies to be treated. It is then possible to treat different ranges of frequencies with the same basic cellular structure and the same diaphragm, as a function of the arrangement of the diaphragm in the cell of the cellular structure.

In other words, a volume of each of the compartments is determined as a function of the intended frequencies.

Optionally, the basic cellular structure is selected as a function of the volumes of the desired compartments, for example by varying the height of the cellular structure.

For example, the cell is a monobloc cell.

The cell may be made of synthetic material, paper or a woven coated or covered with resin or another product improving the rigidity and impermeability, composite material, for example thermoplastic, or metal, or the like, as a function of the intended application.

The cell is formed, for example, by a right cylinder, that is to say, one whose generatrix is orthogonal to the base cross section.

The shape of the base cross section may vary. It is, for example, determined as a function of the mechanical characteristics required for the cellular structure.

For example, the base cross section has a circular or hexagonal shape. In the case of a hexagonal cell, the cellular structure then corresponds to a honeycombed structure in the strict sense.

In one exemplary embodiment, the distance p between the acoustic outlet and the base cross section S of the cell is between 20% and 80% of the height H of the cell.

In one exemplary embodiment, the membrane comprises at least one corrugation.

In one exemplary embodiment, the cellular sound insulation structure comprises a resistive sheet covering the cell on a first side.

In one exemplary embodiment, the cellular sound insulation structure comprises a closure sheet covering the cell on a second side.

For example, the closure sheet may be perforated.

Another aspect also provides an aircraft comprising at least one propulsion unit comprising a nacelle.

For example, the nacelle comprises an air intake having an acoustic panel.

For example, the acoustic panel has a cellular sound insulation structure as described above.

For example, an acoustic skin of the acoustic panel comprises the resistive sheet of the cellular sound insulation structure.

For example, a rear skin of the acoustic panel, configured to ensure structural strength of the acoustic panel, comprises the closure sheet of the cellular sound insulation structure.

Another aspect also provides a method for manufacturing a cellular sound insulation structure, comprising:
- a step of providing at least one cell having a base cross section S of arbitrary shape and a height H;
- a step of providing a diaphragm comprising a membrane, the membrane comprising at least one orifice passing through a thickness of the membrane, and the diaphragm comprising at least one tube surmounting the at least one orifice, the tube comprising a free end, forming an acoustic outlet;
- a step of taking the diaphragm by an insertion tool, comprising a step of gripping a part of the diaphragm by the insertion tool;
- a step of inserting the diaphragm into the cell by the insertion tool until the acoustic outlet is placed at a distance p from the base cross section S;
- a step of fixing a part of the diaphragm against an internal wall of the cell; and
- a step of releasing the diaphragm by the insertion tool.

Such a method makes it possible to insert different types of diaphragms into different configurations of cells and to fix the diaphragm therein.

Specifically, the cells of a cellular structure may vary greatly, particularly in cross-sectional shape and dimensions, from one cellular structure to another.

In parallel, the diaphragm to be inserted may also vary as a function of the acoustic frequencies to be treated and the cellular structure for which it is intended.

In this context, such a method for producing a cellular sound insulation structure formed from at least one cellular structure, into at least one cell of which a diaphragm is inserted, may be fitted to different shapes of cells and diaphragms.

Thus, starting with the selected basic cellular structure (that is to say, initially without a diaphragm), which may even be standard, the diaphragm is arranged in the cell as a function of the frequencies to be treated, that is to say, at a predetermined distance from a base cross section of the cell. It is then possible to treat different ranges of frequencies with the same basic cellular structure and the same diaphragm, as a function of the arrangement of the diaphragm in the cell of the cellular structure.

In one exemplary embodiment, the step of gripping a part of the diaphragm comprises a step of suction by the insertion tool.

In one exemplary embodiment, the step of releasing comprises a step of ending the suction of a part of the diaphragm by the insertion tool.

In one exemplary embodiment, the method comprises a step of pressing the part of the diaphragm against the internal wall of the cell in order to fix it by a pressure application system of the insertion tool.

Yet another aspect also provides a tool for inserting a diaphragm into a cell of a cellular sound insulation structure.

For example, the insertion tool comprises at least one end-piece configured to be inserted into the cell.

For example, the end-piece comprises at least one gripping system configured to hold or release a part of the diaphragm.

In one exemplary embodiment, the gripping system comprises a suction channel configured to be depressurized and to hold a part of the diaphragm.

In one exemplary embodiment, the end-piece comprises a pressure application system configured to flatten a part of the diaphragm against the internal wall of the cell.

BRIEF DESCRIPTION OF THE DRAWINGS

The invention, according to one exemplary embodiment, will be understood better and its advantages will become clearer on reading the following detailed description, given by way of indication and without any limitation, with reference to the appended drawings, in which.

Identical elements represented in the aforementioned figures are identified by identical numerical references.

DETAILED DESCRIPTION OF THE PREFERRED EMBODIMENTS

Figure 1:
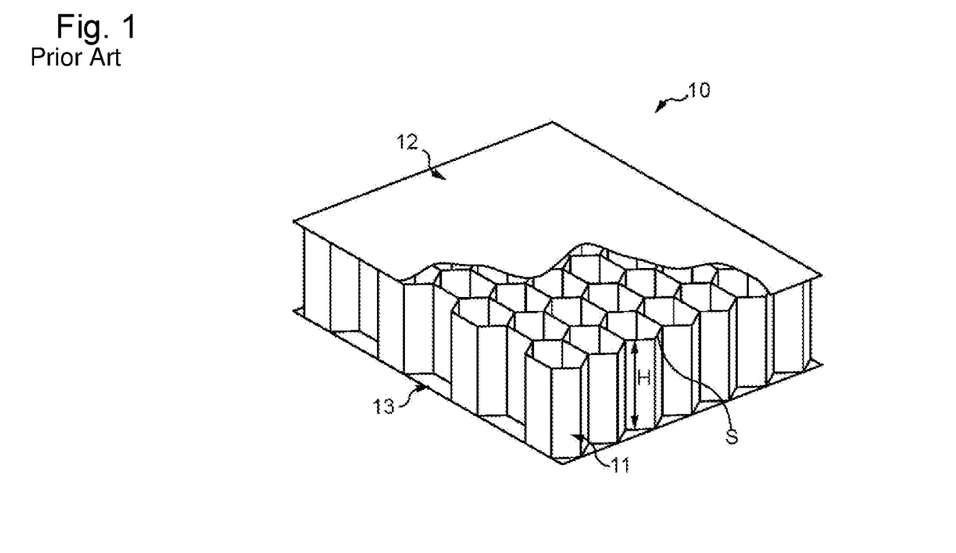
FIG. 1 represents a cellular sound insulation structure in a schematic perspective view.

FIG. 1 schematically represents a traditional, or basic, cellular sound insulation structure 10.

It comprises cells (also termed cavities) 11 juxtaposed with one another along two mutually orthogonal directions. A third direction, which is orthogonal to the previous two, corresponds to a thickness of the cellular structure, which is also defined by a height H of the cells 11.

In the example represented in FIG. 1, the cellular structure is provided on a first side of the cellular structure with a resistive sheet 12 that covers the cells 11. The resistive sheet 12 is optionally perforated. It forms a resistive surface allowing communication of the cells 11 with an external environment.

On a second side of the cellular structure, the cellular structure is provided with a closure sheet (rear skin) 13, which closes the cells 11.

The closure sheet 13 may be a solid sheet. It may nevertheless be a sheet having perforations. A solid sheet is generally used for simple acoustic treatment, referred to as SDOF (Single Degree of Freedom), and forms a rear skin configured to reflect acoustic waves. A perforated closure sheet is generally used for so-called DDOF (Double Degree of Freedom) acoustic treatment, for which a stack of two honeycomb levels is produced, the levels being separated by a porous intermediate skin formed by the closure sheet 13.

In FIG. 1, in order to show the cellular structure more clearly, the resistive sheet or layer 12 is represented as covering only some of the cells 11.

The cells 11 of the cellular structure 10 which are represented here are so-called hexagonal cells, their volume being that of a right cylinder, with a hexagonal base cross section S, extending between the resistive sheet 12 and the closure sheet 13 over the height H.

The cells are furthermore arranged in a quincunx, being nested in one another, here without defining a dead volume.

Figure 2:
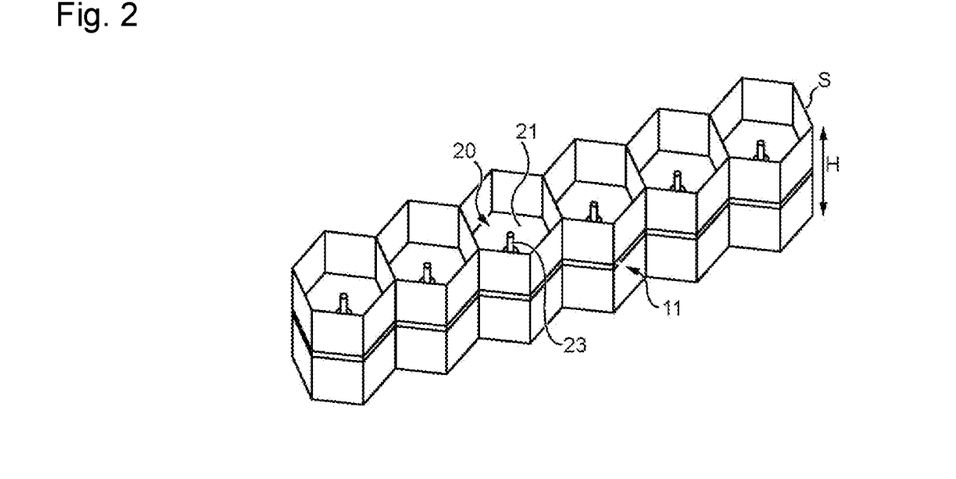
FIG. 2 presents a series of cells making it possible to form a cellular structure such as that of FIG. 1, implementing one exemplary embodiment according to the invention.

FIG. 2 presents a series of cells 11 making it possible to form a cellular structure 10 similar to that of FIG. 1, implementing one exemplary embodiment according to the invention.

For example, the cell 11 is a monobloc cell.

Here, the cells 11 have a hexagonal base cross section S, like those of FIG. 1, although they could have any other shape, in particular, an at least partly circular shape.

The base cross section S here denotes a cross section of the cell at one end of the cell.

Figure 3:
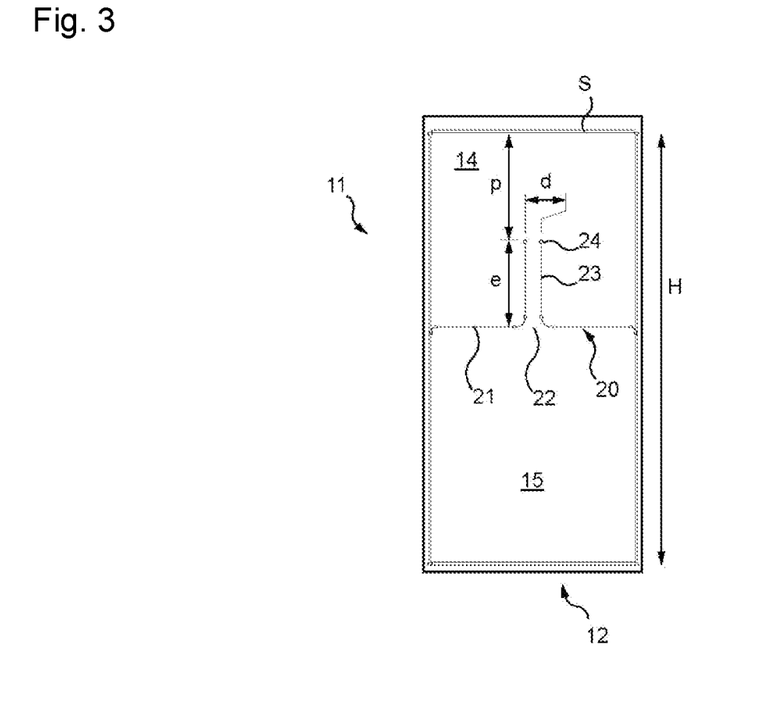
FIG. 3 shows, in cross section, a cell of a cellular structure according to one exemplary embodiment of the invention, as schematized in FIG. 2.

Furthermore, by definition here, the cell 11 comprises an internal wall 16 (indicated in FIG. 3).

The cell 11 may be made of synthetic material, for example a thermoplastic matrix, paper or a fiber woven coated with resin, or of metal, or the like, as a function of the intended application.

According to the invention, the cell 11 of FIG. 2 comprises a diaphragm 20 arranged along a cross section of the cell 11.

The diaphragm 20 is, for example, made at least partly of elastomer (for example of silicone, etc.), metal, thermoplastic, resin, or the like.

The diaphragm 20 comprises at least one membrane 21.

The membrane 21 is, for example, bonded, by an adhesive or a resin, or soldered or welded into the cell 11, in particular here to the internal wall 16 of the cell or at its border.

The membrane may have a contour of any shape, for example of circular shape, which allows it to be fitted to a large number of cell cross-sectional shapes.

For example, the diaphragm 20 blocks an entire cross section of the cell 11 in which it is arranged, either on its own or in cooperation with an adhesive or another material that fills a possible gap between at least a part of the contour of the membrane 21 and the internal wall 16 of the cell, so that the diaphragm 20 divides the cell 11 into two compartments 14, 15 (which are indicated in FIG. 3).

In one exemplary embodiment, the membrane may have a transverse dimension, for example a diagonal or a diameter if it has a contour of circular shape, less than or equal to the corresponding dimension of the cross section of the cell where the membrane is arranged, thus possibly leaving a gap between at least a part of the contour of the membrane 21 and the internal wall 16 of the cell, which is then possibly filled with an adhesive or the like.

For example, the membrane 21 may be relatively undeformable and rigid, and in return it may have a smaller thickness giving it a lighter weight.

Such a diaphragm is, for example, made of composite material.

In another exemplary embodiment, the diaphragm 20 may have a transverse dimension, for example a diameter, greater than a corresponding dimension of the cross section of the cell in which it is arranged, so that it blocks the entire cross section on its own.

Specifically, for its introduction into the latter, the membrane is then, for example, configured to be compressed in order to penetrate therein.

In such a case, the membrane may comprise at least one corrugation.

The at least one corrugation may be preformed in the membrane 21 and/or be induced by the compression of the membrane when it is positioned in the cell 11.

One advantage with a preformed corrugation is that it allows extension of the membrane with respect to its resting position, in addition to facilitating and guiding deformations in compression, according to requirements.

According to one exemplary embodiment, the at least one corrugation may be static.

According to another exemplary embodiment, the at least one corrugation may be configured to allow deployment of the membrane.

This makes it possible, in particular, to manufacture and store the diaphragm over a smaller height, which makes it possible to save space.

Adhesion between the diaphragm 20 and the cell 11 of the cellular structure 10 is, for example, produced by using an adhesive supplemented by a natural pressure effect offered by the membrane 21 on the internal wall 16 of the cell (the membrane attempting to return to its free state once inserted into the cell).

In the case of a cell 11 made of thermoplastic material and a diaphragm 20 also made of thermoplastic material, the connection between them may be produced by welding, without the need for an adhesive.

Thus, in one exemplary embodiment, the membrane 21 has a flexibility and deformability which are configured to adapt to the shape and tolerance variations of the cellular structure, i.e., for example of the order of 1 to 3 mm in radius.

The diaphragm 20 furthermore comprises a central zone which is open in acoustic terms, and here, in particular, a tube 23 which extends from one face of the membrane 21.

Here, the tube 23 denotes a conduit having any type of cross section, which may have dimensions that are or are not constant over the height of the tube, and forming a protuberance with respect to the membrane. It may be cylindrical or frustoconical, with a polygonal or circular cross section.

A polygonal cross section is, for example, hexagonal.

In a cellular structure with hexagonal cells (conventional honeycomb), for example, the tube has, in particular, a circular or hexagonal cross section.

On the other hand, in a cell with a non-hexagonal cross section (for example in a cellular structure with a flexible core, often referred to as "flexcore"), the tube, more particularly, has a circular cross section, and is frustoconical instead.

The two compartments communicate acoustically with one another only through the tube 23, the membrane 21 being sealed over its contour to the internal wall 16 of the cell 11.

Figure 13:
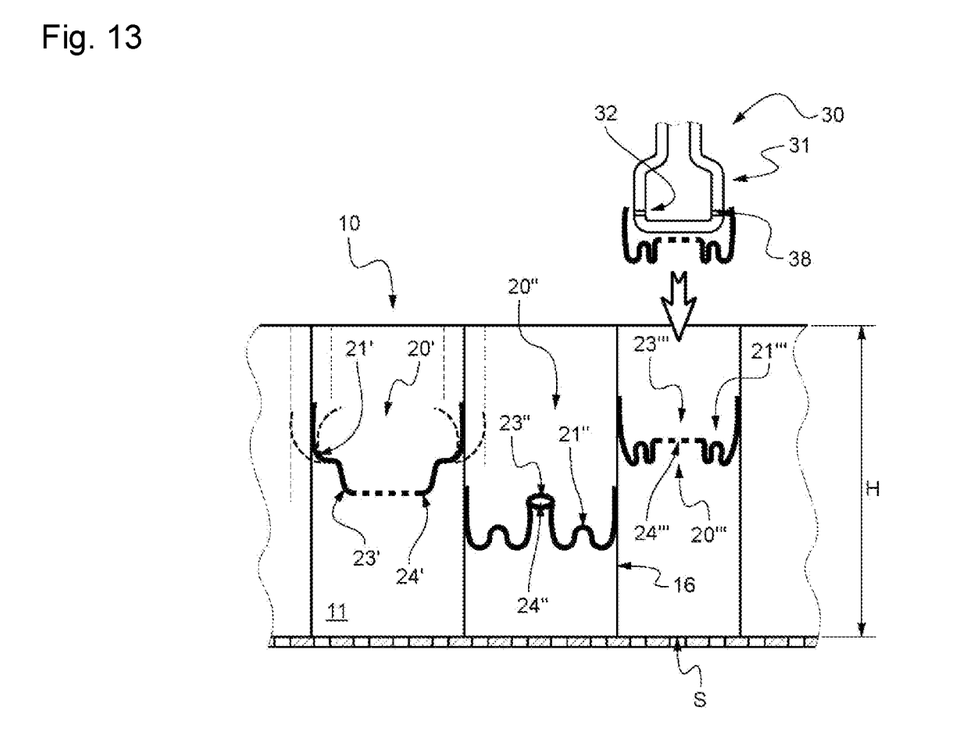
FIG. 13 shows diaphragms and an insertion tool according to other exemplary embodiments of the invention.

A free end of the tube, forming an acoustic outlet, may, for example, have an entirely open cross section, a hole, as represented in FIG. 3, or FIG. 13 for the tube 23", or it may comprise a porous wall, a set of microperforations, or a woven, for example a metallic woven, for example as illustrated in FIG. 13 under the references 23' and 23'".

Such a tube 23 is configured to maintain an undeformable zone and favor a deformable zone around this undeformable zone. It makes it possible to define a physical interface which accentuates adaptability of the membrane while protecting the acoustic zone.

It is thus possible not to deform the acoustic outlet, given that it is assumed here that there is no deformation of the acoustic zone within a tolerance of less than 10% cross-sectional variation of the acoustic outlet, which is equivalent to a pressure drop of about 10%.

According to one characteristic of the diaphragm according to this embodiment, the acoustically open central zone, i.e., the tube 23, has a rigidity at least equal to a rigidity of the membrane 21.

This may, for example, be achieved by a greater thickness for this open central zone (in particular the tube 23) than for the membrane 21 when they are made of the same material.

FIG. 3 shows a cell 11 such as those of FIG. 2 in cross section.

This figure shows that the diaphragm 20 divides the cell 11 into two compartments 14, 15. The outer peripheral edge of the membrane is fixed to the internal wall 16 of the cell 11, between the two ends of the wall 16 of the cell in the direction of the height H, so as to be able to divide it into two compartments 14, 15.

Starting with a selected cellular structure, the membrane 21 is arranged in the cell 11 as a function of the acoustic frequencies to be treated.

For example, the membrane 21 is arranged along a cross section of the cell.

In one exemplary embodiment, an intersection between the membrane 21 and the internal wall of the cell 11 is arranged parallel to the base cross section S and at a distance from the base cross section S.

The membrane 21 comprises at least one open central part, for example an orifice 22.

Here, the orifice 22 is centered with respect to the cross section of the cell where the membrane 21 is arranged.

The tube 23 surmounts the orifice 22 and extends into the compartment 14 here.

In particular, the tube 23 extends from an edge of the orifice 22, so that a diameter of the orifice 22 is equal to an internal diameter d of the tube 23.

The tube 23 is thus also centered with respect to the cross section of the cell.

The free end of the tube 23, forming an acoustic outlet 24, may comprise a hole (as in FIG. 3, or FIG. 13 for the tube 23") or a set of microperforations, or a woven, for example a metallic woven, for example as schematized in FIG. 13 (with the references 23' and 23'").

The tube 23, and, in particular, the cross section of the acoustic outlet 24, are, for example, undeformable under stresses induced during steps of inserting the diaphragm into the cell. For example, the cross section of the acoustic outlet 24 remains unchanged between a free state and when the diaphragm is inserted into the cell, within a tolerance of 10% cross-sectional variation of the acoustic outlet, which is equivalent to a pressure drop of about 10%.

If required, an adaptation capacity of the diaphragm is provided by the membrane, which is configured to deform as a function of the dimensions and shape of the cell.

The two compartments 14, 15 then communicate acoustically, or fluidically, with one another through the tube 23.

The compartment 14 into which the tube 23 extends is thus configured to treat low frequencies, whereas the compartment 15, located on the other side of the diaphragm 20 in the cell 11, is configured to treat high frequencies.

Here, the tube 23 is cylindrical, for example with a circular cross section.

According to another advantageous exemplary embodiment, it could have a hexagonal cross section.

Here, the tube 23 has a height e equal to at least three times its diameter, and, in particular, at least three times the diameter of the cross section of the acoustic outlet 24 of the tube 23.

Here, the tube 23 has an internal cross-sectional diameter which is constant over its entire height e, or, for example, constant over at least 50% of the height e, starting from the acoustic outlet 24.

The diaphragm 20 is arranged in the cell 11 as a function of the frequencies to be treated. Thus, starting with a selected cellular structure, the diaphragm is, for example, arranged with the acoustic outlet 24 at a distance p, which is determined as a function of the frequencies to be treated, from the base cross section S.

For example, the distance p is between 20% and 80% of the height H.

The diaphragm is, for example, arranged with the acoustic outlet 24 at one third of the height, or two thirds of the height or half-way up, according to a given acoustic specification and dimensions (height and cross section) of the cell of the cellular structure in question.

In the present example illustrated in the figures, the membrane 21 is located approximately half-way up the cell, i.e., at about 50% of the height H starting from the base cross section S, and the acoustic outlet 24 is here at about 25% of the height.

A volume of each of the compartments 14, 15 therefore varies accordingly, and they are substantially equivalent here.

Such a cellular structure with a diaphragm thus makes it possible to treat a wider range of acoustic frequencies than the same cellular structure without a diaphragm.

A diaphragm according to the invention thus allows simpler acoustic dimensioning. The acoustic waves are channeled by the tube. Such a diaphragm is industrially more robust because it is easier to ensure that the acoustic waves are taken up by the tube, this being less dependent on the shape and the size of the cross section of the cells. Furthermore, such a diaphragm may be fitted to a large number of cells that differ in shape and dimensions.

Figure 4:
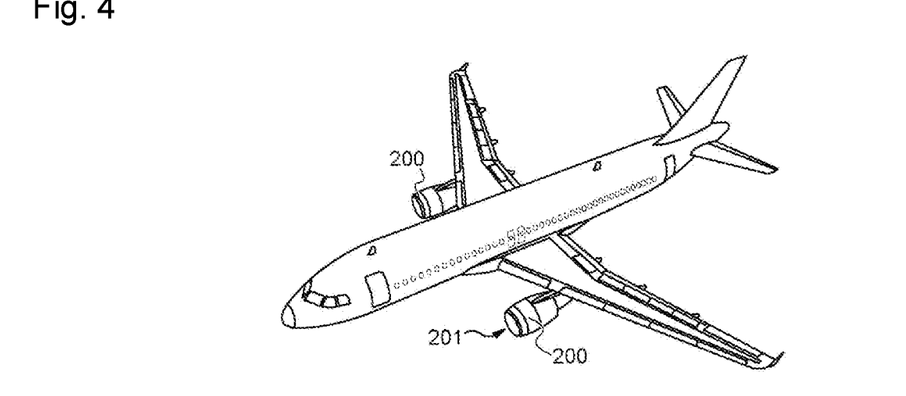
FIG. 4 is a perspective view of an aircraft comprising a nacelle having an air intake.

FIG. 4 shows a twin-jet aircraft having two nacelles 200, which have an air intake 201.

Figure 5:
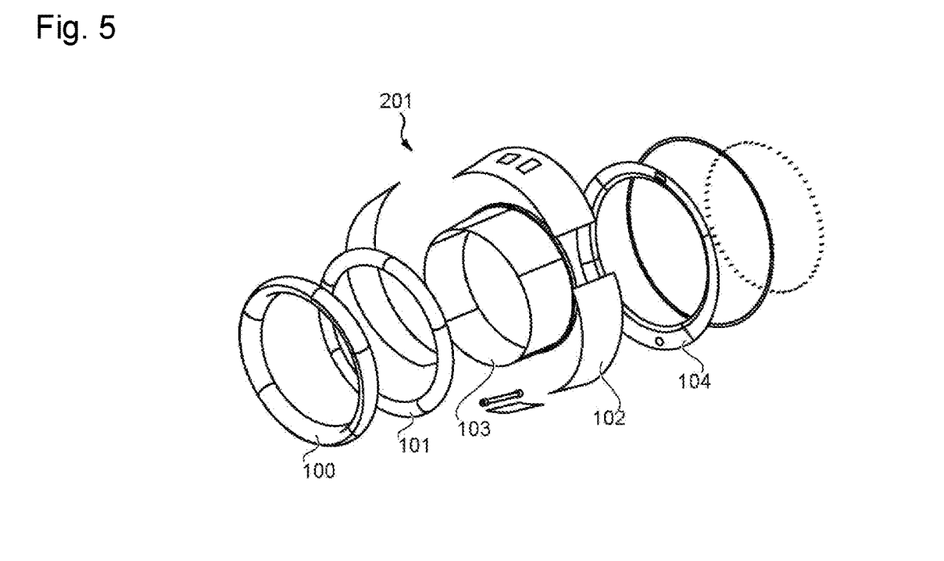
FIG. 5 schematically shows an exploded view of a nacelle air intake as represented in FIG. 4.

FIG. 5 shows an exploded view of an air intake 201 of a nacelle 200 of a propulsion unit of an aircraft as represented in FIG. 4.

The air intake 201 comprises structural elements such as a front frame 101 and a rear frame 104 as well as, from the upstream end of the nacelle 200 to the downstream end, a lip 100 carried by the front frame 101, external panels 102 continuing the lip 100 outside the nacelle 200 (and forming an external wall of the air intake), an internal wall 103 continuing the lip inside the nacelle and delimiting a central duct for channeling the air in the direction of the engine, the external panels and the internal wall being carried by the front frame 101 and the rear frame 104.

The shape of the air intake and the systems with which it is equipped must make it possible to avoid the formation and/or accumulation of ice or frost, ensure an aerodynamic function, prevent birds from entering the fan compartment containing the engine systems, and limit the effect of noise pollution.

Figure 6:
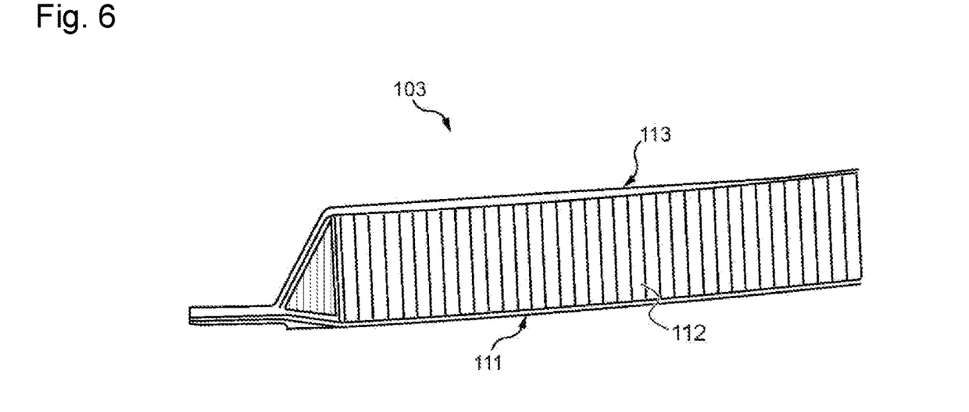
FIG. 6 is a lateral cross section of an acoustic panel of an air intake as illustrated in FIG. 5.

In order to fulfil the latter function, the internal wall 103 is an acoustic panel, which is represented, for example, in cross section in FIG. 6.

The acoustic panel 103 then comprises a cellular structure as described above, i.e., for example:
- a porous, perforated or microperforated so-called acoustic or resistive skin 111, which forms, for example, a visible face of the panel (that is to say, a face turned towards the interior of the central duct of the air intake); the purpose of this resistive skin is to transmit the sound waves and possibly also at least partially dissipate their energy in the form of heat,
- a rear skin 113, which essentially has the function of ensuring the structural strength of the acoustic panel, and
- a core 112, on either side of which the resistive skin 111 and the rear skin 113 are fixed, which core contributes both to the mechanical strength and to the acoustic dampening, the main function of the core being to trap and dampen the sound waves.

Here, the core 112 comprises cells with a diaphragm according to one of the exemplary embodiments of the invention.

In the case in which the acoustic panel is a zone capable of picking up ice or water, this panel may incorporate a heating element, for example in the form of a heating tube or wire.

However, since an acoustic panel may be formed from various basic cellular structures, the cells of which may be provided with different diaphragms, it is beneficial to be able to provide a method for producing at least the cellular sound insulation structure and a diaphragm insertion tool which can be adapted to different configurations.

Figure 7:
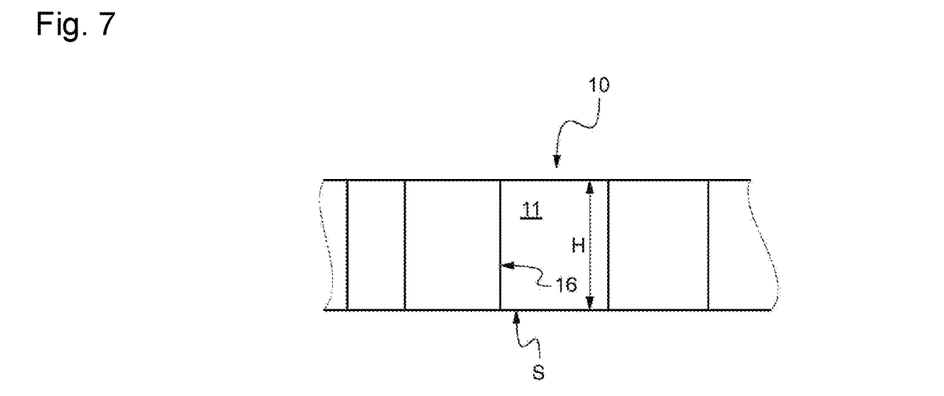
FIG. 7 schematically shows a cross section of cells of a basic cellular structure, for example as illustrated in FIG. 1.

FIG. 7 schematically shows a cross section of cells 11 of a basic cellular structure, for example as illustrated in FIG. 1 or having any other shape of base cross section S or height H.

Each cell 11 has an internal wall 16.

Figure 8:
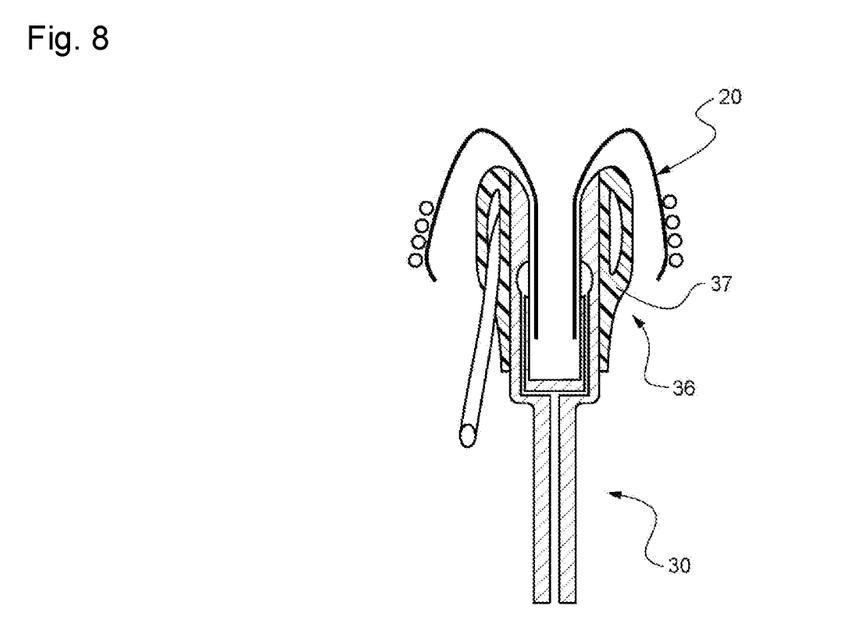
FIG. 8 illustrates a step of taking a diaphragm by an insertion tool according to one exemplary embodiment of the invention.

In order to position a diaphragm 20 in a cell 11 as schematically shown in FIG. 7, FIG. 8 illustrates a step of taking the diaphragm 20 by an insertion tool 30 according to one exemplary embodiment of the invention.

Figure 9A:
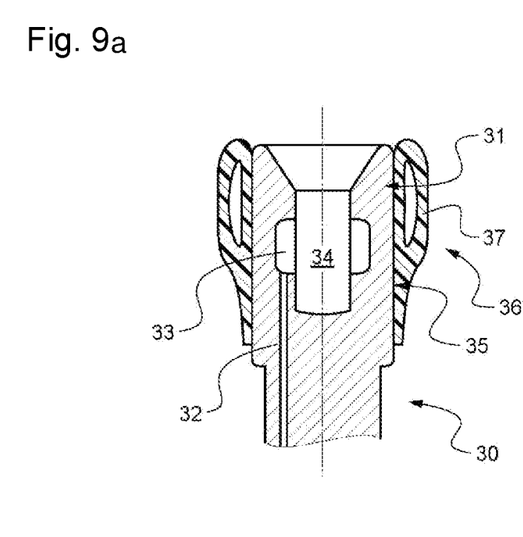
FIGS. 9a and 9b schematically represents two exemplary embodiments of the insertion tool according to the invention.
Figure 9B:
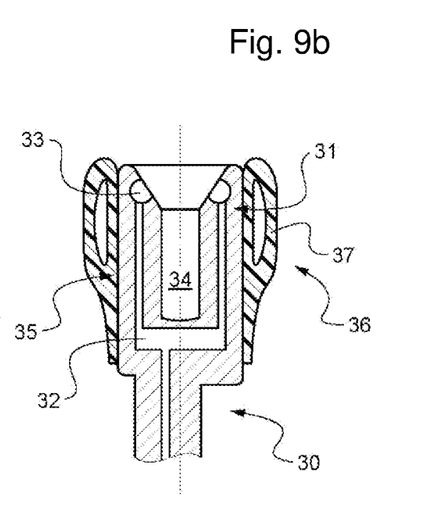

Such an insertion tool 30 is, for example, schematically shown in FIGS. 9a and 9b according to two alternative embodiments.

The insertion tool 30 according to the invention comprises at least one end-piece 31 which is configured to be inserted into the cell 11, with the diaphragm 20.

The end-piece 31 comprises, for example, a gripping system which is configured to hold and release a part of the diaphragm 20.

In the exemplary embodiment schematized in the figures, the gripping system comprises at least one channel 32, referred to as a suction channel 32, which is configured to be at least depressurized.

The suction channel 32 is thus configured to hold the diaphragm 20 by suction, by the sucker effect.

In these figures, the end-piece 31 comprises a bore 34 which extends from a tip of the end-piece 31.

Such a bore 34 is configured to receive a tube of the diaphragm, for example a tube 23 of a diaphragm 20 as represented in FIGS. 2 and 3.

For such a diaphragm, it may then be particularly convenient to hold it by the tube.

To this end, the suction channel 32 opens into the bore 34.

In particular, the suction channel 32 opens into a groove 33 hollowed into a wall of the bore 34, here all around the bore 34, so that the suction can be carried out all around a part of the tube.

For holding of the diaphragm 20 which limits the risks of damage to the diaphragm 20, in particular at an interface between the tube and the membrane, which may be produced jointly in a single piece or separately and subsequently assembled, the bore 34 comprises a deep cylindrical part and an opening flared part, which is, for example, frustoconical here.

In the exemplary embodiment of FIG. 9a, the groove 33 is hollowed into the deep cylindrical part so that it lies facing a lateral wall of the tube when a diaphragm is taken by the tool.

In the exemplary embodiment of FIG. 9b, the groove 33 is hollowed into the frustoconical opening part so that it then lies facing an end of the tube when a diaphragm is taken by the tool, or an interface between the tube and the membrane. Such a configuration is, for example, beneficial for a diaphragm having a tube with a small height.

Externally, the end-piece 31 comprises a lateral wall 35.

The external lateral wall 35 is, for example, cylindrical in order to be able to be inserted easily into all types of cells.

According to one beneficial option, the end-piece 31 here comprises a pressure application system 36 arranged on the external lateral wall 35.

Such a pressure application system 36 is mainly configured to flatten and press a part of the diaphragm 20 against the internal wall 16 of the cell 11, in particular to fix it thereto.

In the exemplary embodiment illustrated in FIGS. 9a and 9b, the pressure application system 36 comprises an inflatable bladder 37.

The inflatable bladder 37 is then configured to be inflated in order to press a part of the diaphragm 20 against the wall 16 of the cell when the diaphragm is positioned in the cell 11, and otherwise to be deflated.

According to another exemplary embodiment, which is represented in FIG. 13, the pressure application system may comprise an injection channel 38 configured to deliver air under pressure.

Optionally, in this exemplary embodiment, the injection channel 38 and the suction channel 32 are formed by one and the same channel, which is selectively depressurized or supplied with air under pressure.

Thus, during a first step, the insertion tool 30 is configured to take and hold a diaphragm 20 by suction of a part of the diaphragm 20 by using the suction channel 32, which creates a sucker effect.

Figure 10:
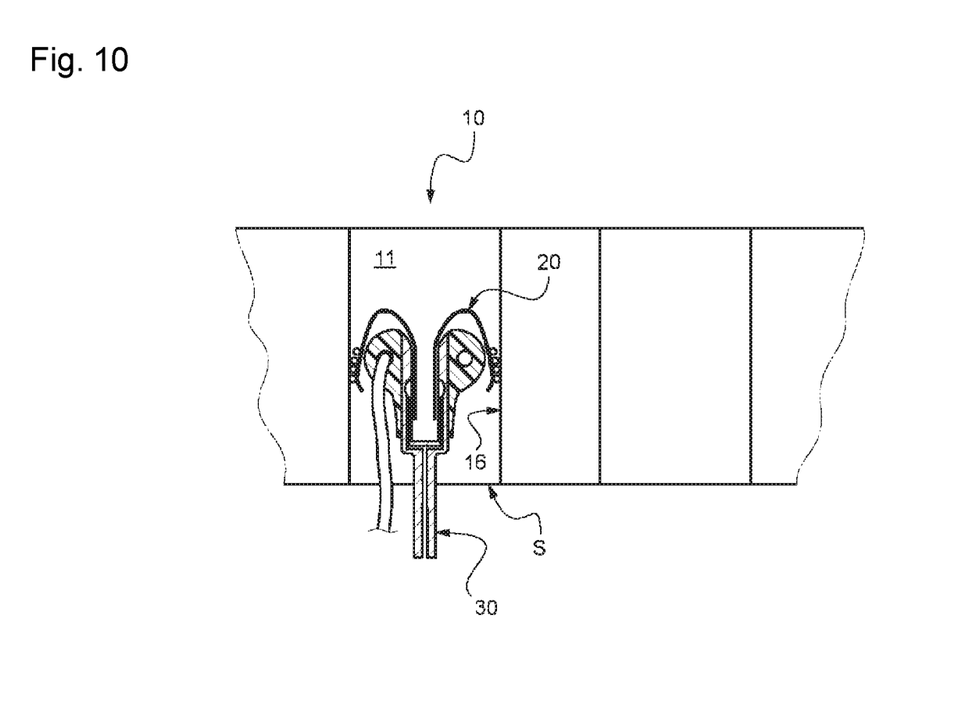
FIG. 10 illustrates a step of inserting the diaphragm into a cell while holding it by the insertion tool, according to the embodiment of FIG. 8.

FIG. 10 next illustrates a step of inserting the diaphragm 20 into a cell 11 by the insertion tool 30, which holds it in the suction channel 32 by reduced pressure.

In this example, the step of inserting the diaphragm 20 into the cell 11 comprises a step of pushing the diaphragm 20 into the cell 11 by the insertion tool 30.

As illustrated here, when the membrane is larger than a corresponding cross section of the cell, a part of the membrane of the diaphragm is then folded onto the same side as the tube, thus covering the top of the insertion tool 30.

Once the diaphragm 20 is in the intended position in the cell 11, the method may comprise a step of pressing the part of the diaphragm 20 against the wall 16 of the cell 11 in order to fix it.

When the membrane is larger than the cross section of the cell, it may be naturally flattened against the internal wall 16 of the cell by resilience.

The pressure is, for example, produced here by the pressure application system 36 of the insertion tool 30, which flattens the part of the diaphragm 20 against the wall 16 of the cell 11.

In the example illustrated, the inflatable bladder 37 is inflated and flattens a part of the membrane 21 against the wall 16 of the cell 11.

Simultaneously or subsequently, the method then comprises a step of fixing the part of the diaphragm 20, which is optionally pressed against the wall 16 of the cell 11.

The fixing may be carried out by bonding, for example by an adhesive which comprises, for example, a resin, or, for example, by welding, or any other means.

The adhesive is, for example, an adhesive of the epoxy resin type.

If the diaphragm has a dimension smaller than the corresponding cross section of the cell, the method may comprise a step of injecting an adhesive that fills a possible gap between a contour of the membrane and the internal wall 16 of the cell and fixes the diaphragm in the cell.

The adhesive is, for example, an adhesive of the epoxy resin type, a flexible adhesive or an elastomer which makes it possible to fill such a gap.

The adhesive may advantageously be added onto the external surfaces of the membrane 21 by spraying or immersion.

Before or after the fixing step, the method comprises, for example, a step of releasing the diaphragm 20 by the insertion tool 30.

To this end, this step comprises at least a step of ending the suction by the insertion tool 30, and optionally a step of ending the pressure application by the pressure application system 36; for example, the inflatable bladder 37 is deflated.

The suction channel 32 is then returned to ambient pressure, for example.

Optionally, the suction channel 32 may also be configured to blow in a slight air pressure in order to release the diaphragm more rapidly, or to avoid adhesion between the diaphragm 20 and the insertion tool 30.

Figure 11:
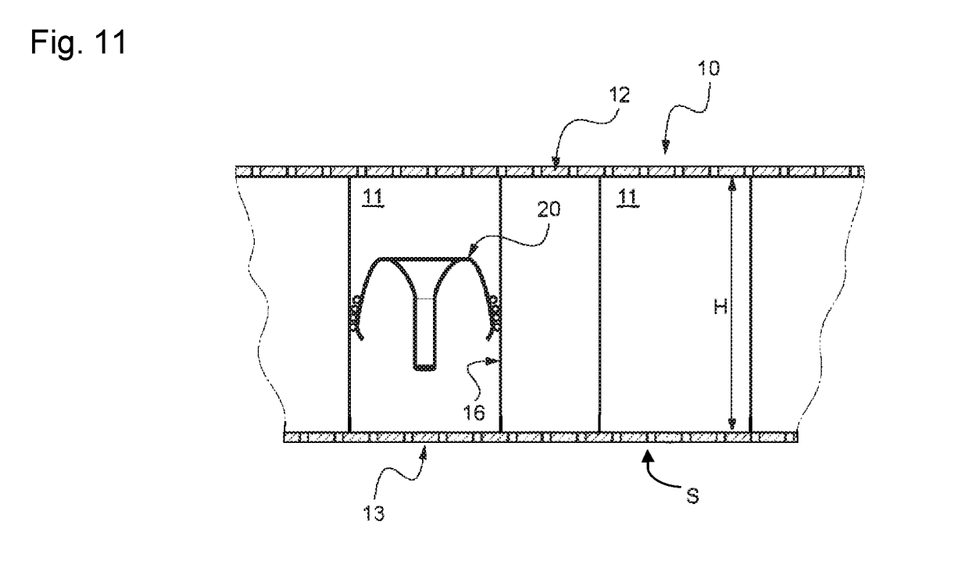
FIG. 11 schematically represents the diaphragm in place in the cell.

FIG. 11 schematically illustrates the diaphragm 20 in place in the cell 11, released from the insertion tool 30.

With such a method, it is possible, in particular, to insert more than one diaphragm, whatever it may be, into the same cell 11.

It is then possible to continue the production of the cellular sound insulation structure.

For example, the method next comprises a step of applying a resistive sheet 12 which covers the cells 11, including the diaphragm, on a first side of the cellular structure 10.

The resistive sheet 12 may optionally be perforated. It forms a resistive surface allowing communication of the cells 11 with an external environment.

The method may also comprise a step of applying a closure sheet 13, which closes the cells 11 on a second side of the cellular structure.

The closure sheet 13 may be a solid sheet. It may nevertheless be a sheet having perforations. A solid sheet is generally used for simple acoustic treatment, referred to as SDOF (Single Degree of Freedom), and forms a rear skin configured to reflect acoustic waves. A perforated closure sheet is generally used for so-called DDOF (Double Degree of Freedom) acoustic treatment, for which a stack of two honeycomb levels is produced, the levels being separated by a porous intermediate skin formed by the closure sheet 13.

Figure 12:
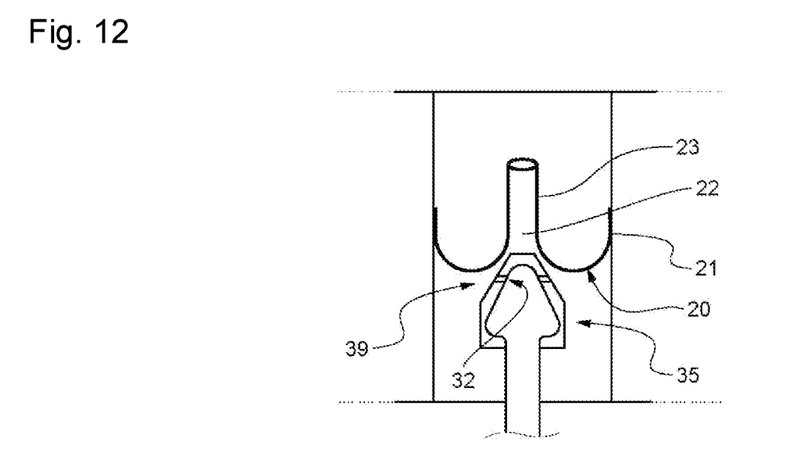
FIG. 12 illustrates a step of inserting the diaphragm into a cell while holding it by an insertion tool according to another exemplary embodiment.

FIG. 12 shows another exemplary embodiment of the present invention.

In this figure, the external lateral wall 35 of the end-piece 31 of the insertion tool 30 comprises a frustoconical part 39, a cross section of which narrows in the direction of the tip of the insertion tool 30.

Furthermore, the end-piece 31 of the insertion tool 30 differs from that of FIGS. 9a and 9b in that the suction channel 32 opens onto a part of the external lateral wall 35, that is to say, towards the outside and not towards the inside as in FIGS. 9a and 9b, and, in particular, the suction channel 32 opens onto the frustoconical part 39 here.

A tool such as the one represented in FIG. 12 is, for example, useful for taking and holding a diaphragm 20 on an opposite side of the membrane 21 with respect to the side from which a tube 23 extends.

The frustoconical part 39 is then configured to be placed under an end of the tube 23 at the interface with the membrane 21, for example around an orifice 22.

The insertion tool 30 then holds the diaphragm 20 by suction of a part of the diaphragm 20 around the orifice 22.

In the example represented, the insertion tool 30 makes it possible to insert the diaphragm 20 into the cell 11 by traction.

Optionally, the suction channel 32 may also be configured to blow in an air pressure in order to release the diaphragm 20 more rapidly, or to avoid adhesion between the diaphragm 20 and the insertion tool 30.

Lastly, FIG. 13 shows diaphragms 20', 20", 20'" and an insertion tool 30 according to other exemplary embodiments of the invention.

Here, for example, the diaphragm 20' comprises a membrane 21' and a tube 23', of which the free end forming an acoustic outlet 24' here comprises a plurality of microperforations.

The diaphragm 20" here comprises, for example, a membrane 21" which comprises a corrugation, and a tube 23", here similar to the tube 23 described above, the acoustic outlet 24" of which comprises a hole with a dimension equal to that of a diameter of the tube 23".

The diaphragm 20'" here comprises a membrane 21'" which comprises a corrugation, like the membrane 21", and a tube 23", the acoustic outlet 24'" of which comprises a plurality of microperforations, in a similar way to that of the tube 23'.

According to exemplary embodiments which are not represented, the acoustic outlet of the tube could comprise a woven zone.

Each of these diaphragms 20', 20", 20'" may possibly be inserted into a cell 11 by an insertion tool 30 according to the invention, for example as illustrated here.

Furthermore, in this example the end-piece 31 is, for example, configured to hold the diaphragm 20', 20", 20'" by a part of its membrane 21', 21", 21'", in particular close to its periphery.

To this end, as in the example of FIG. 12, here the suction channel 32 opens onto a part of the external lateral wall 35.

As before, the suction channel 32 may optionally also be configured to blow in an air pressure in order to release the diaphragm 20', 20", 20'" more rapidly, or to avoid adhesion between the diaphragm 20', 20", 20'" and the insertion tool 30.

Furthermore, the suction channel 32 may also be configured to allow more powerful injection, for example air under a high pressure, and thus form an injection channel 38 of a pressure application system configured to deliver air under pressure in order to press a part of the membrane 21', 21", 21'" against the wall 16 of the cell 11.

According to one exemplary embodiment, the at least one corrugation may be static.

According to another exemplary embodiment, the at least one corrugation may be configured to allow deployment of the membrane.

In this case, the method may comprise a suction step, for example during a baking step, in order to deploy the diaphragm.

This makes it possible, in particular, to manufacture and store the diaphragm over a smaller height, which makes it possible to save space.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cellular sound insulation structure comprising:
a plurality of cells, each cell of the plurality of cells having a base cross section of arbitrary shape and a height extending between a first side and a second side, each cell of the plurality of cells being juxtaposed along two orthogonal directions relative to at least two cells of the plurality of cells,
wherein each cell of the plurality of cells comprises a diaphragm, the diaphragm comprising
a membrane dividing the cell into two compartments along the height, the membrane comprising at least one orifice passing through a thickness of the membrane and an outer peripheral edge fixed to an internal wall of the cell, and
at least one tube enclosing the at least one orifice and extending from a face of the membrane into one of the two compartments, the tube comprising a free end, forming an acoustic outlet, which is positioned at a distance from the base cross section,
wherein the membrane is folded such that the outer peripheral edge of the membrane is located along the height between the orifice and one of the first and second sides.

2. The cellular sound insulation structure according to claim 1, wherein a distance between the acoustic outlet and the base cross section of the cell is between 20% and 80% of a height of the cell.

3. The cellular sound insulation structure according to claim 1, wherein the acoustic outlet of the tube comprises at least one of the at least one orifice, microperforations or a woven zone.

4. The cellular sound insulation structure according to claim 1, wherein the membrane comprises at least one corrugation.

5. The cellular sound insulation structure according to claim 1, further comprising a resistive sheet covering the cell on the first side and a closure sheet covering the cell on the second side, the closure sheet being perforated.

6. An aircraft comprising at least one propulsion unit comprising a nacelle, the nacelle comprising an air intake having an acoustic panel, the acoustic panel having a cellular sound insulation structure according to claim 1, of which an acoustic skin comprises a resistive sheet and a rear skin, configured to ensure structural strength of the acoustic panel, comprises a closure sheet.

7. A cellular sound insulation structure comprising:
  at least one cell having a base cross section of arbitrary shape and a height,
  wherein the cell comprises a diaphragm, the diaphragm comprising
    a membrane dividing the cell into two compartments along the height, the membrane comprising at least one orifice passing through a thickness of the membrane and an outer peripheral edge fixed to an internal wall of the cell, and
    at least one tube enclosing the at least one orifice and extending from a face of the membrane into one of the two compartments, the tube comprising a free end, forming an acoustic outlet, which is positioned at a distance from the base cross section,
    wherein the membrane comprises at least one corrugation positioned between the outer peripheral edge and the at least one tube, the at least one corrugation configured to allow extension of the membrane from a resting position.

* * * * *